United States Patent [19]
Oszczakiewicz et al.
[11] Patent Number: 4,460,904
[45] Date of Patent: Jul. 17, 1984

[54] INK JET INK HANDLING SYSTEM

[75] Inventors: Michael J. Oszczakiewicz, Penfield; Walter F. Leising; Matthew P. Wojciechowski, both of Webster, all of N.Y.
[73] Assignee: Xerox Corporation, Stamford, Conn.

[21] Appl. No.: 439,526
[22] Filed: Nov. 5, 1982
[51] Int. Cl.³ .............................................. G01D 15/18
[52] U.S. Cl. .................................... 364/75; 346/140 R
[58] Field of Search ....................... 346/75, 140 R, 1.1; 400/126

[56] References Cited

U.S. PATENT DOCUMENTS 3,761,953 9/1973 Helgeson .............................. 346/75
4,238,804 12/1980 Warren ................................. 346/75
4,318,114 3/1982 Huliba ............................. 346/140 R

*Primary Examiner*—Joseph W. Hartary

[57] ABSTRACT

An ink handling system in an ink jet printer. In accordance with the invention an ink handling system is constructed including two ink processing loops. A first relatively low-volume, high pressure ink handling loop or circuit routes ink to an ink jet printhead for directing one or more columns of ink toward a printing medium. A second relatively high volume yet low-pressure loop or circuit routes ink through a number of processing stations which, for example, include ink de-aeration, filtration, and temperature control. The bulk of the processing is performed in this second loop, yet limited processing steps are also performed in the high-pressure, low-volume circuit which directs ink to the printhead. As ink is lost due to evaporation and/or printing on the print medium, the ink is replenished via an ink source which is coupleable to a main ink tank forming a portion of the high-volume ink handling loop.

6 Claims, 4 Drawing Figures

INK JET INK HANDLING SYSTEM

BACKGROUND OF THE INVENTION

Field of the Invention

The present invention relates to ink jet printing in general and more particularly to an ink processing system for use in a Rayleigh-type ink jet printer.

Various types of ink jet printers are known in the art. A common characteristics of these printers is the generation of ink droplets which are directed toward specified locations on a print medium such that the resulting ink pattern generates a desired message on the medium. In so-called Rayleigh or synchronous-type ink jet printing, a continuous stream of ink droplets is generated by squirting a column of ink through a nozzle. Selected ones of the series of droplets are allowed to strike the print medium and other ones of the droplets are intercepted prior to reaching the printing plane. By selectively choosing those droplets which are to be intercepted, the information pattern or message is encoded.

The typical Rayleigh-type ink jet printer comprises a drop generator having an acoustic cavity from which one or more ink columns are squirted. Ink is supplied to the acoustic cavity under pressure so that the ink squirts through one or more nozzles defined by an aperture plate. An external source of acoustic excitation causes ink columns from the one or more nozzles to break up into a continuous sequence of uniform droplets at a specified distance from the droplet generator.

At the point of droplet breakoff a charge is induced on the ink droplet by a charging electrode. The charge level placed upon each droplet controls the subsequent trajectory of that droplet as it moves toward the paper at the printing plane. Downstream from the charging position, the charged ink droplets travel through a set of deflection electrodes which provide a uniform electric field for each droplet. In one synchronous ink printer design the droplets not intended to strike the print medium are deflected away from their initial trajectory so that they strike a droplet gutter. This unused ink is recirculated for subsequent use in the printhead. It is important that the gutter remain unclogged and achieve a high throughput of ink as the printer operates. It is possible that a second calibration gutter is located behind the print plane to aid in calibrating the ink jet system. Other droplets are charged in accordance with a scheme which precisely locates the ink droplets on the print medium. In a typical printer the paper will be moving with respect to the drop generator and the choice of charge must take this movement into account if the information pattern is to properly appear on the printed page.

Specialized electronics is required to control the ink droplet trajectory. In a print system comprising multiple ink nozzles the electronics must be capable of decoding print or no print signals for each droplet from each of the multiple nozzles and inducing specified charges onto each droplet generated by these multiple nozzles. Since a continuous stream of ink droplets is generated in the Rayleigh-type system, at each moment multiple ink droplets will be traveling toward either the paper plane or the gutter. These ink droplets interact by exerting both electrostatic and aerodynamic forces on each other. The electronics in the typical printer must also take into account the interaction between ink droplets and compensate for this interaction at the charging step.

Droplet sensors located above and below a typical droplet trajectory are used in calibrating the electronics. These sensors can be used to detect both the presence and the velocity of ink droplets as they travel towards to the calibration gutter. The electrical output from the sensors is fed back to a system controller which, in turn, calibrates the electronics so that an printer accurately prints information stored in its memory or received along communication lines.

The pressure at which ink is pumped into the printhead and the physical characteristics of the ink both effect ink jet printing performance. The pressure can be used to control the point of droplet breakoff so that the ink droplets form at a precise location in relation to the charging electrodes. The composition of the ink effects both appearance on the printed medium but also effects performance of the drop generator and control electronics. Control of ink pressure, concentration, contaminants, and air concentration should, therefore, be performed in an ink processing loop prior to the point of entry into the printhead.

The ink handling subsystem needed in a high-speed, Rayleigh-type printer is quite sophisticated. Provision must be made to start and stop all ink jets on command so that downstream components such as the charging tunnels and deflection plates are not contaminated. Jet calibration must be rapidly accomplished so that printing begins as soon as possible after jet startup. In addition, the ink must be pumped, filtered, valved, deaerated, and replenished taking into account ink properties, materials, electrical control, inter-connecting tubing, fittings, and overall machine architecture. The ink must remain relatively free of particles, particularly those which might clog the jets, cause jet misdirection, or disable other ink systems such as pumps or valves. The filters used to maintain the ink at a contaminant free level must not present unwarranted hydraulic resistance. Air bubbles must be eliminated so that an air locking failure does not occur. Another separate de-aeration requirement is to remove air dissolved in the ink to prevent bubble appearance during times of system depressurization.

Proper ink valving insures crisp startup and shutdown. It is desirable, for example, that the system promote quick jet formation by directing ink into a calibration guttering system. During shutdown, pressure must be reduced quickly to avoid jet weeping and also avoid air ingestion into the drop generator. As printing occurs, ink is lost due to both marking and evaporation so that ink must be added to the system without changing the characteristics of the ink.

The ink handling problems noted above have been addressed by certain prior art ink jet printing devices. U.S. Pat. No. 4,318,114 illustrates one prior art system. The apparatus disclosed in that patent provides a mechanism for continuously circulating the ink in an ink jet printer system when the ink nozzles are shut down. More particularly, the apparatus disclosed in that patent shows a valve arrangement connected to a pump outlet to provide a means for controlling the flow rate of ink supplied to a printhead. During periods of printer shutdown, a substantially reduced ink flow is maintained in the printhead. Further details regarding the control over fluid flow rate and configuration are shown at column 5 of U.S. Pat. No. 4,318,114. While the above reference and other patents show various methods for controlling certain ones of the problems noted above with regard to ink handling in an ink jet system, none of the references known in the art suggests the efficient, high-performance, ink handling system embodied by the present invention.

SUMMARY OF THE INVENTION

The present invention relates to a new and improved ink handling subsystem for use in an ink jet printer. The subsystem includes an ink drop generator having an ink cavity in communication with one or more nozzles and a mechanism for delivering ink to the cavity so that the one or more nozzles squirt ink toward a print medium. The mechanism for delivering the ink includes means for controlling the pressure so that control over droplet breakoff location can be exercised. The subsystem further includes an ink processing loop coupleable to the droplet generator for circulating ink at a lower pressure than the pressure with which ink is forced through the ink jet nozzles. The ink processing loop has one or more processing stations where the condition of the ink delivered to the droplet generator is both monitored and maintained in accordance with desired design criteria.

The preferred ink handling subsystem comprises two processing loops to route ink through the subsystem. A main or high pressure loop provides ink flow to the printhead with limited processing steps such as: de-aeration, filtration and venting. The crucial feature of this high-pressure loop is pressure control. An auxiliary or lower pressure loop provides a low pressure and high flow fluid movement to perform the bulk of the filtration, de-aeration and fluid restoration steps required in an ink jet printing system. Further details regarding both the main and auxiliary processing loops are provided in a detailed description of the preferred embodiment of the invention.

It should be appreciated from the above that one object and feature of the present invention is the provision of a dual loop ink handling system wherein a first of the two loops provides high pressure ink to an ink jet printing generator and wherein a second auxiliary loop provides the bulk of the ink processing and handling features required in such a system. Other objects, advantages and features of the present invention will become clear when a detailed description of a preferred embodiment of the invention is discussed in conjunction with the accompanying drawings.

DETAILED DESCRIPTION OF THE PREFERRED EMBODIMENT

Figure 1:
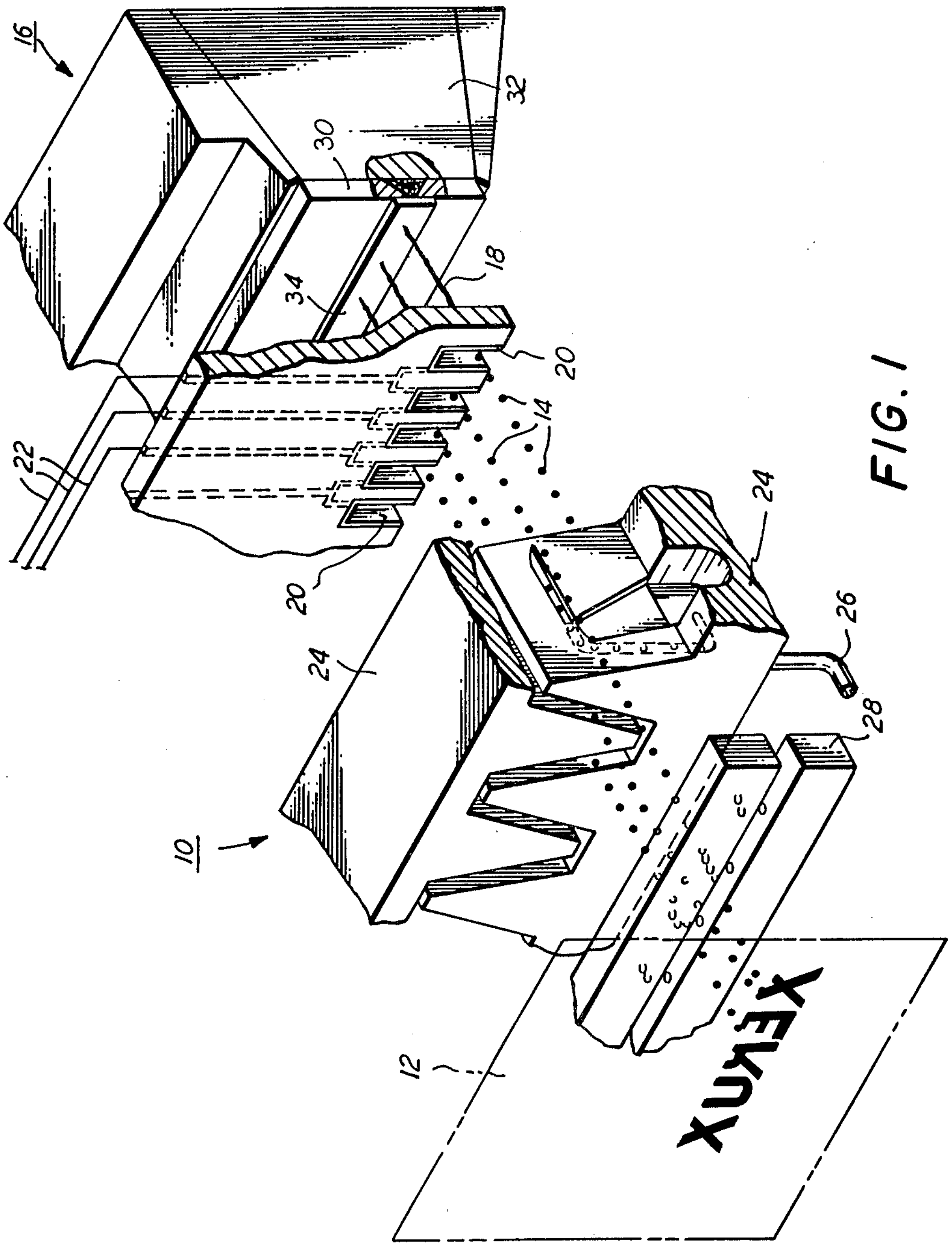
FIG. 1 is a perspective view of an ink jet printer having multiple printing nozzles spaced across a print plane.

Turning now to the drawings and in particular FIG. 1, there is shown an ink jet printing system 10 comprising apparatus for selectively encoding a print medium 12 with ink droplets 14 in a controlled pattern. The functioning and operation of the apparatus will be described briefly and for a more detailed description of such a system reference is made to U.S. Pat. No. 4,238,804 to Warren which issued on Dec. 9, 1980. The Warren patent is incorporated in the present application by reference.

Figure 4:
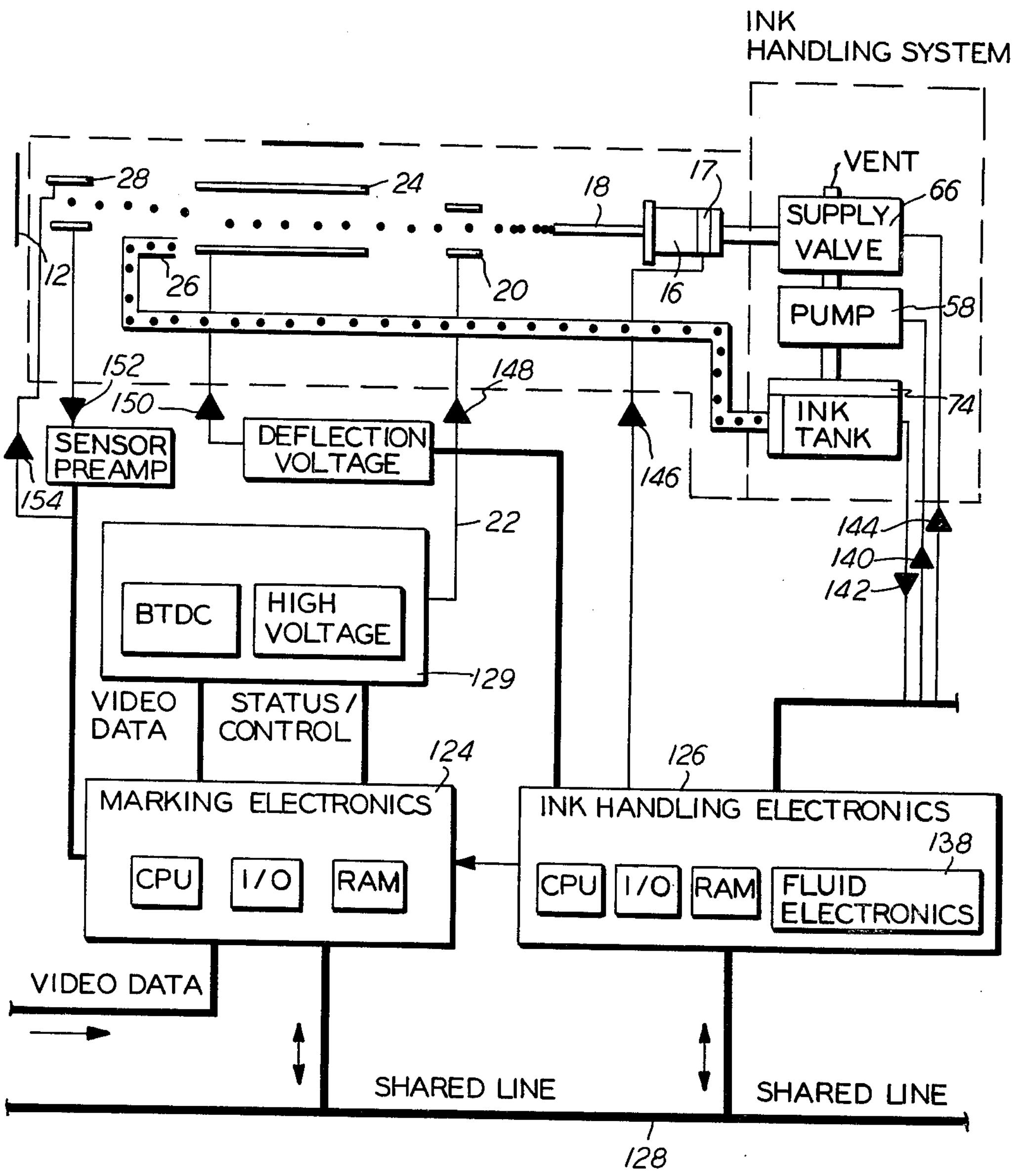
FIG. 4 schematically illustrates electronics for monitoring and controlling the ink handling subsystem performance.

The FIG. 1 system 10 comprises a drop generator or printhead 16 from which multiple columns 18 of ink are squirted in the direction of the print medium 12. A droplet exciter 17 (FIG. 4) comprising a portion of the generator 16 perturbs the ink columns 18 causing them to break up into individual droplets 14 at a well defined distance from the drop generator 16. At the point of droplet break-off, charge tunnels 20 fixed in relationship to the generator 16 induce specified net charges on the ink droplets for controlling their subsequent trajectory in their travel to the print medium. The induced charge can be controlled by changing the voltage on the charge tunnels 20 and in particular electronics shown in FIG. 4 is coupled to these charge tunnels 20 by data inputs 22 along which voltage control signals are transmitted.

The charged droplets continue in their trajectory towards the print medium and pass in the vicinity of a series of interleaved deflecting electrodes 24. These electrodes maintain high-strength electric fields in the path through which the charge droplets must travel if they are to reach the print medium. Certain ones of the charged droplets are deflected by the electric field generated by the electrodes 24 into a gutter 26 for recirculation back to the drop generator 16. Those droplets which are not guttered are deflected to desired pixel locations on the print medium to encode the medium with a pattern corresponding to the information to be printed. The disclosed system 10 also comprises a sensor array 28 which maintains the printing system 10 in calibration by monitoring the deflection response of the ink droplets to the deflecting fields generated by the deflecting electrodes 24. Thus, periodically, the sensor array 28 generates position information for analysis by drop sensor electronics (FIG. 4) so that the system is maintained in calibration.

In state of the art ink jet printing systems like that disclosed in FIG. 1, the drop generator 16 comprises a number of discrete elements which are separately fabricated. As seen in FIG. 1, for example, the generator 16 comprises an acoustic body 30 in which ink under pressure is directed from an ink supply. The acoustic body 30 is coupled to a backing member 32 through which the ink is routed to the acoustic body 30. Finally, a nozzle plate 34 is attached to the acoustic body 30 so that apertures formed in the nozzle plate 34 direct ink streams through the charging 20 and deflecting 24 electrodes to the print medium 12.

Figure 2:
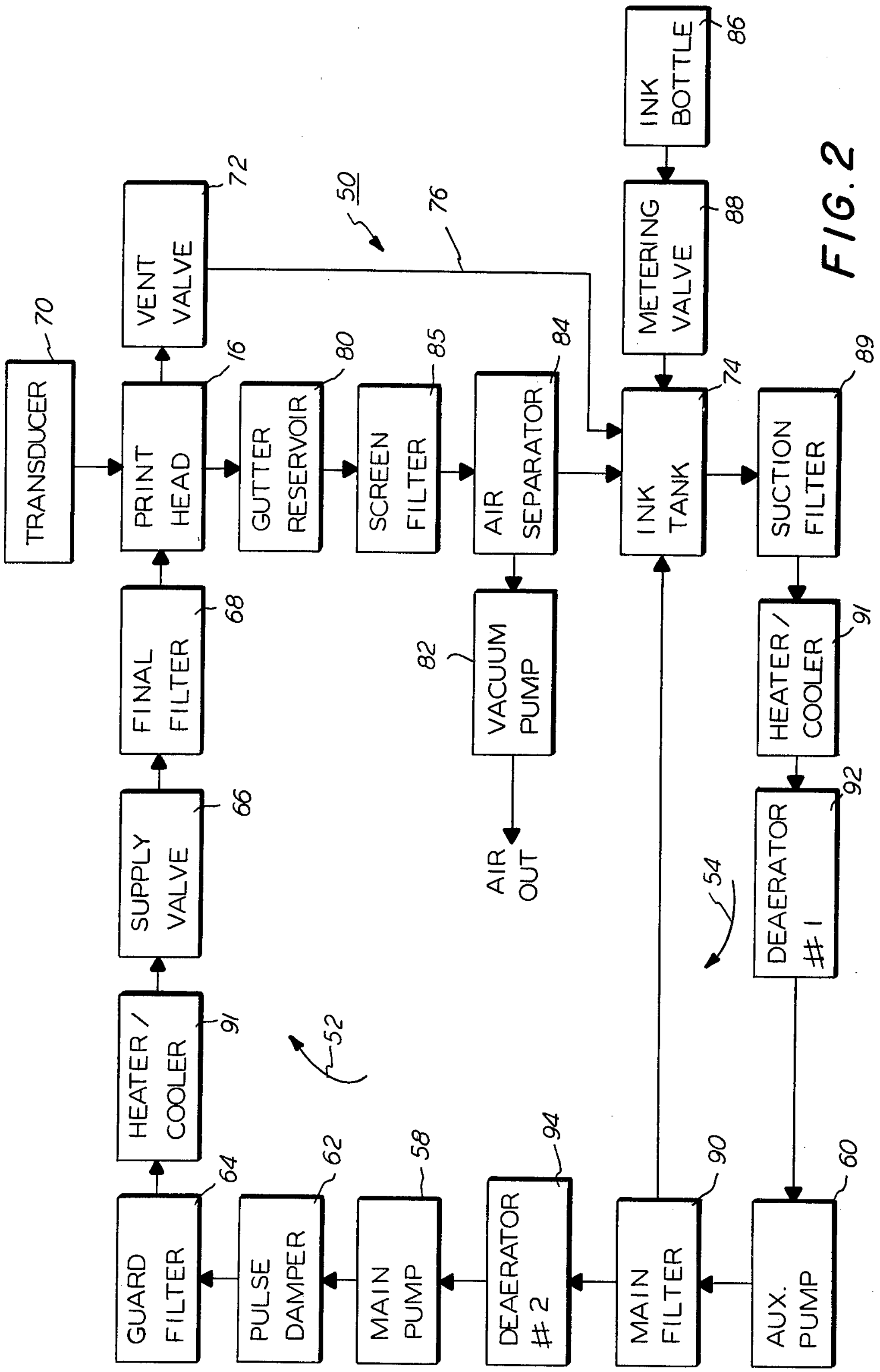
FIGS. 2 and 3 are schematics showing an ink handling subsystem which delivers ink to a printhead in said printer.

An ink handling system 50 provides usable ink to the drop generator 16 and is shown schematically in FIG. 2. This system, in addition to providing usable ink to the drop generator 16 also processes ink caught by the guttering system and circulates that ink back to the drop generator 16. The ink handling system 50 must initialize printing so that all jets startup without contaminating downstream conponents such as charge tunnels and deflection plates.

The ink handling system 50 is divided into two distinct processing loops, a first loop 52 which delivers ink to the printhead 16 and a second, lower pressure auxiliary or secondary loop 54 which provides the bulk of the ink processing steps. The auxiliary or secondary loop 54 may be located away from the printhead 16 but preferably the elements of the high pressure primary loop 52 should be located in close proximity to that printhead 16. Ink movement through the ink handling system is provided by a main pump 58 and an auxiliary pump 60 located in the main and auxiliary processing loops respectively. The main pump 59 comprises a reciprocating solenoid pump capable of providing a pressure of about 90 pounds per square inch and a throughput in the order of 80 cc of ink per minute. The main pump 58 provides ink to the printhead 16 through a pulse damper 62 which reduces pressure variations in the ink. A guard filter 64 prevents pump generated debris from passing through the printhead and a supply valve 66 allows printhead operation to be rapidly started or shut down. The supply valve comprises a two-way normally closed solenoid operated valve which has a response time of approximately 5 milliseconds. A final filter 68 traps debris that may be generated at the supply valve 66. A transducer 70 monitors pressure in the generator 16 and generates control signals used to control the pressure provided by the pump 58.

A vent valve 72 controls jet shutdown by depressurizing the drop generator after the supply valve 66 is closed. Excess ink then returns to an ink tank 74 via a bypass route 76. During printing operation, those droplets directed away from the print medium by the deflection electrodes strike a gutter 26 integrally formed with the deflection electrodes and move to a gutter reservoir 80. A vacuum pump 82 creates sub-atmospheric pressure in an air separator tank 84 which causes air and ink from the guttering system to pass through the gutter reservoir and a screen filter 85 which separates debris from the guttered ink. The ink is then returned to the ink tank 74 where it mixes from with fresh ink from an ink bottle 86 coupled to the ink tank 74 through a metering valve 88. Ink does not circulate through the ink bottle 86 but is fed to the ink tank 74 as needed.

The auxiliary processing loop 54 provides a fluid flow capability in excess of the main pump requirements to cause ink to circulate through a suction filter 89, a main ink filter 90, a heater/cooler 91 and de-aerator 92. The auxiliary pump 60 need only pressurize the ink to overcome movement resistance created by the main filter 90. A suitable auxiliary pump 60 provides a pressure in the range of 5 to 15 pounds per square inch and has a fluid flow capacity in the range 300 to 500 cc per minute. The main filter 90 removes virtually all particulate contaminants such that only minor filtration is required in the high pressure loop prior to the ink reaching the printhead 16. The primary de-aerator 92 is supplemented by a secondary de-aerator 94 in the main ink handling loop 52. It has been seen that the temperature of the ink can affect printhead operation so a heater/cooler 91 is included in the secondary as well as the main ink handling loops.

The main pressure pump 58 is a reciprocating solenoid pump driven at a constant frequency and duty cycle. Pressure is changed by proportionally varying a drive voltage applied to the pump. In a preferred control scheme, a 12 bit digital to analog converter generates an output which is then amplified by an amplifier 140 (see FIG. 4) to control a main pump pressure within a range from 0 to 100 pounds per square inch. Overpressure protection is provided to shut down the pump at 90 pounds per square inch to prevent component damage.

Pressure is monitored by means of a pressure transducer 70 mounted near the printhead 16. The transducer provides an output of from 0 to 100 millivolts which is amplified and fed back to ink handling electronics 126. The transducer 70 provides a feedback and monitoring capability to ensure that the output from the main pump 58 corresponds to a desired pressure for generating ink jets from the printhead 16. A preferred design utilizes a transducer which operates in the desired 0 to 100 pounds per square inch range with 0.5 percent accuracy. Once a pressure set point is established, that set point can be adjusted utilizing feedback information from the transducer 70 to ensure a proper jet break-off point is maintained for the multiple nozzles spaced across the printhead 16.

Figure 3:
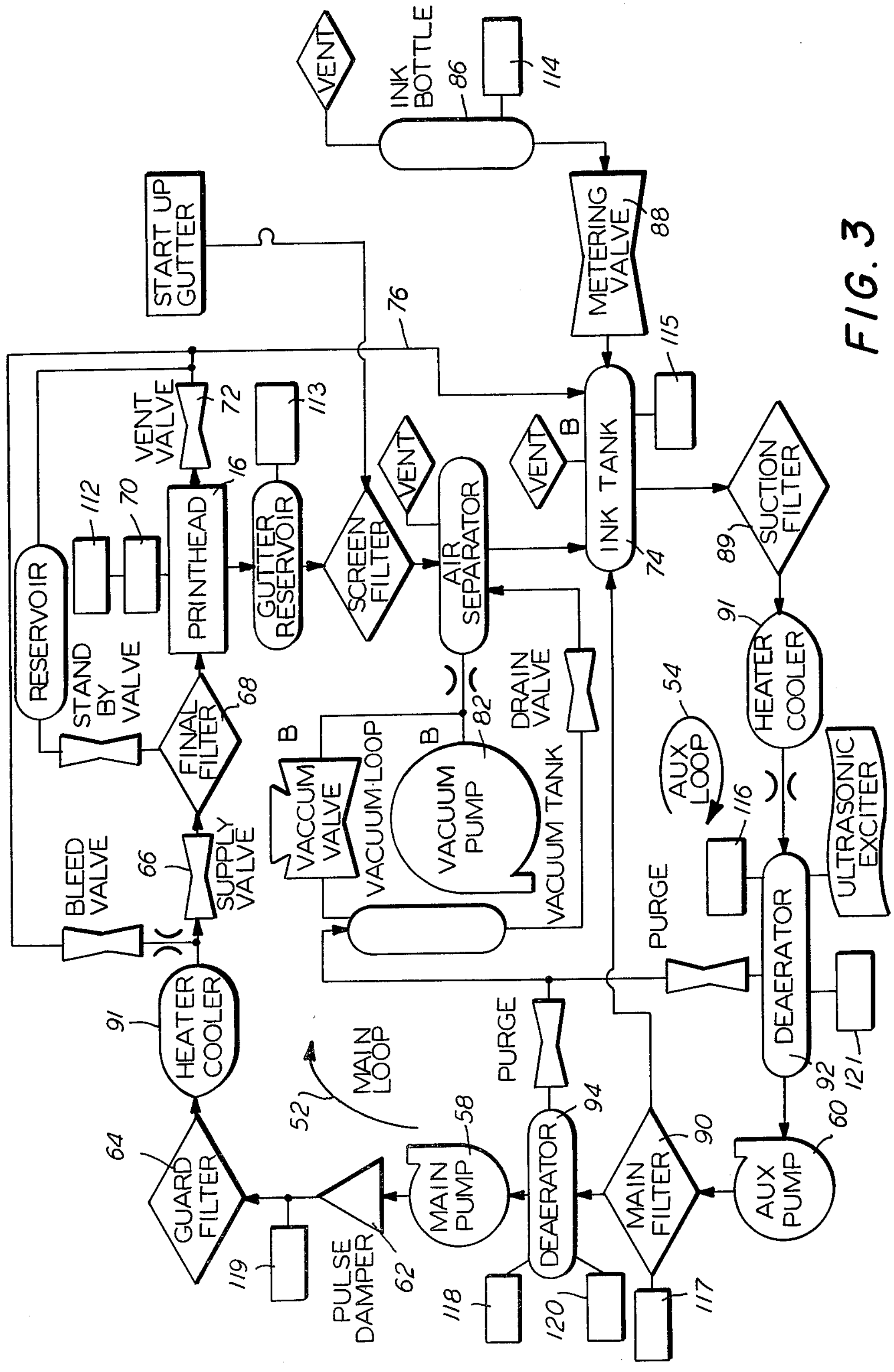

A number of sensors 112–121 are needed in the ink handling system for the present printer. These sensors monitor pressure 113,119, temperature 112,117 air content 120,121, and fluid level 114,115,116,118. The location of these sensors is shown in FIG. 3 which is a more detailed description of the ink handling system shown in schematic form in FIG. 2. Thermistors 112,117 are mounted in the main filter and the printhead to provide feedback control for the heaters/coolers 91 located upstream from the de-aerators 92,94. Four ink level sensors 114,115,116,118 are used in the present ink handling system. Oxygen content in both de-aertors is monitored by probes 120,121 whose output are read by a 12 bit digital to analog converter.

All sensors and controls are computer managed. A schematic of a suitable control arrangement for the printing system is shown in FIG. 4. That schematic divides the electronics into two groups, the marking electronics 124 and the ink handling electronics 126. Each of these groups of electronic circuits communicates with a shared line communications bus 128 via a serial communications chip. As seen in the schematic, the marking electronics is primarily responsible for dictating the charge placed on individual ink droplets at the charge tunnel 20. To accomplish this charging the marking electronics 124 sends video data and control signals to specialized electronics 129 which generates voltage signals for transmittal to the charge tunnels 20. Details regarding the specialized electronics may be obtained by reference to co-pending U.S. patent application Ser. No. 326,721 entitled "Ink Jet Control Method and Apparatus" to Marchand. This copending application is incorporated in the present application by reference. The ink handling electronics 126 dictates and monitors pressure, temperature, air concentration, and ink level in the ink jet system.

The ink handling electronics 126 comprises its own central processor 132, input/output circuits 134, memory 136, and specialized ink handling electronics 138. As seen in FIG. 4, the ink handling electronics interfaces with the supply valve 66, pump 58, and ink tank 74 via signal amplifiers 140,142,144. Other amplifiers 146,148,150,152, and 154 interface the printer electronic control with the droplet exciter in the printhead 16, the charge tunnel 20, the deflection plates 24, and the droplet sensor array 28. The amplifiers shown in FIG. 4 are exemplary of other control signal generating amplifiers which interface with the ink handling systems shown in FIGS. 2 and 3.

The two processing loops comprising the invention have been described with a degree of particularity. It is apparent that certain modifications and alterations could be made in the disclosed ink handling system. It is the intent, however, that the invention cover all such modifications and alterations falling within the spirit or scope of the appended claims.

We claim:

1. In an ink jet marking system, an ink handling subsystem comprising:

an ink drop generator having an ink cavity in communication with one or more nozzles and means for delivering ink to said cavity so that one or more ink columns squirt through said one or more nozzles toward a printing medium, said means for delivering including means for controlling the pressure of ink delivered to said drop generator, and an ink processing loop coupleable to the generator for circulating ink at a pressure lower than the pressure of the ink delivered to said drop generator and having one or more ink processing stations wherein the condition of ink delivered to the drop generator is monitored and maintained.

2. The system of claim 1 wherein the marking system further comprises means for intercepting selected ink droplets as they travel toward the printing medium and means for circulating said intercepted droplets back to the drop generator.

3. The system of claim 1 wherein the ink processing loop comprises an ink replenishment station, an ink filtering station, and an ink temperature control station.

4. The system of claim 1 wherein the ink processing loop and the ink marking system include means for circulating ink even though no ink is squirted through said one or more nozzles.

5. In an ink jet printer having a recirculating ink supply system where droplets ejected from a printhead not directed to a print medium are routed to a gutter, apparatus defining the recirculating supply system comprising:

means to provide a first high pressure ink path for directing ink to said printhead, collecting ink from said gutter and directing said unused ink back to a main ink supply reservoir, said high pressure path including means for filtering, de-aerating and controlling the pressure of said ink as it is circulated back to the printhead, and a second, lower pressure ink coupleable to said first path and including auxiliary means for filtering, de-aerating and pumping ink in said recirculating supply system.

6. A method in ink jet printing comprising the steps of:

delivering ink under pressure to an ink drop generator to cause ink to be squirted through one or more nozzles in said generator, intercepting some of the ink as it travels to a print medium and recirculating said ink to the drop generator, and moving said ink through a lower pressure processing loop to perform ink replenishment, ink temperature control, ink de-aeration, and ink filtering.

* * * * *